(No Model.)
R. F. GERALD.
HOSE COUPLING.
No. 371,753. Patented Oct. 18, 1887.
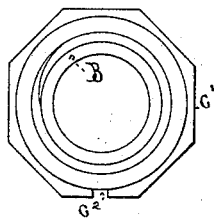
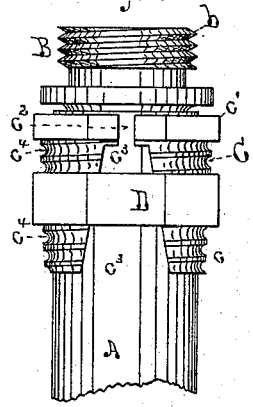
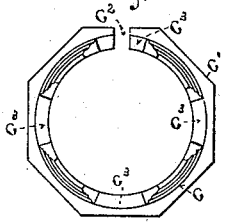
Witnesses
Inventor
Robert F. Gerald.
N. PETERS, Photo-Lithographer, Washington, D. C.

UNITED STATES PATENT OFFICE.

ROBERT F. GERALD, OF BOSTON, MASSACHUSETTS, ASSIGNOR OF TWO-THIRDS TO SAMUEL C. NIGHTINGALE, OF SAME PLACE, AND FRANK C. CHILDS, OF WINCHESTER, MASSACHUSETTS.

HOSE-COUPLING.

SPECIFICATION forming part of Letters Patent No. 371,753, dated October 18, 1887.

Application filed August 3, 1885. Serial No. 173,328. (No model.)

*To all whom it may concern:*

Be it known that I, ROBERT F. GERALD, of Boston, in the county of Suffolk and State of Massachusetts, have invented a new and useful Improvement in Hose-Couplings, of which the following is a specification.

My invention relates to fasteners for couplings of hose and similar elastic tubes; and it consists in certain novel combinations and arrangement of parts, substantially as hereinafter described and claimed.

In the drawings, Figure 1 is a side view of the end of a hose provided with one of my improved coupling-fastenings. Fig. 2 is a view of the outer ring of the coupling-fastening. Fig. 3 is a view of Fig. 1 from the upper end.

A is the hose.

B is the metallic coupling, provided with the screw-thread $b$ to connect it to another piece of hose. The shank of the coupling B is of tubular shape and extends downward into the tubular hose for some considerable distance. Around the outside of this and the hose is secured the sleeve or collar C, which is formed of a cylindrical portion, $c$, and a rectangular portion, $c'$, at its upper end. The rectangular portion is intended to enable it to be held by a wrench in position during the fastening of the hose and coupling together, as hereinafter described, and it has a slot, $c^2$, cut entirely through it, to allow of the requisite compression being brought upon it to close it around the hose A. The cylindrical portion $c$ of the sleeve is made of a conical form on the outside, growing larger in diameter toward the collar part $c'$, and is cut away in a series of slots, $c^3$, which are broadest at their lower ends and become gradually narrower toward the rectangular collar $c'$. The slot $c^2$ in the latter coincides with one of the slots $c^3$ in the tubular portion.

Upon the exterior of the tubular portion $c$ of the sleeve is formed a screw-thread, $c^4$, before it is cut away by the slots $c^3$, which screw-thread is made rounding or approaching a circular form in its grooves, instead of being of a V shape in that part.

A nut, D, is made rectangular on its outer surface and cylindrical in form on its inner surface or bore—that is, its bore is not tapering to conform with the taper of the tubular part $c$ of sleeve C, and the bore of the nut is provided with a screw-thread fitting into and corresponding in shape with the screw-thread $c^4$ of the sleeve C. The taper of the tubular part of sleeve C is quite gradual, and the nut D is screwed onto the tubular part of the sleeve until the requisite compression is produced against the shank of the coupling within the hose to hold the latter in place on the coupling.

It is found that, the tubular portion of sleeve C being provided with notches $c^3$ and a screw-thread, $c^4$, of the shape described, it is possible to produce with the nut D, having a cylindrical bore and a correspondingly-shaped screw-thread, a much greater compression with a given amount of force expended upon the sleeve C than with the tapering nut and V-shaped thread, because the shape of the thread allows of a play or adjustment of the screw-thread of the sleeve to that of the nut in screwing the latter upon the sleeve while bringing the threads to register with each other, which cannot be obtained by a V-shaped thread without cutting out and destroying it. The series of slots $c^3$ in the tubular portion of the sleeve C assist in this adjustment of the threads on the sleeve and within the nut to each other, while the slot $c^2$ allows of the compression of the sleeve upon the hose as the nut D is screwed home upon the sleeve.

What I claim as new and of my invention is—

The combination of the coupling B, hose A, and slotted sleeve C, provided with a series of slots, $c^3$ $c^3$, in its tubular portion, and a screw-thread thereon having its groove approximating a circular shape in the bottom, and the nut D, provided with a cylindrical bore and a correspondingly-shaped internal screw-thread, substantially as described.

ROBERT F. GERALD.

Witnesses:
N. P. OCKINGTON,
DAVID HALL RICE.